E. F. WESTON.
Skate.
No. 210,730.  Patented Dec. 10, 1878.
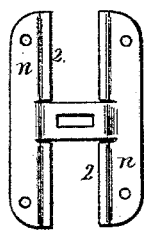
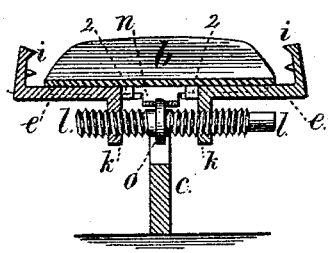
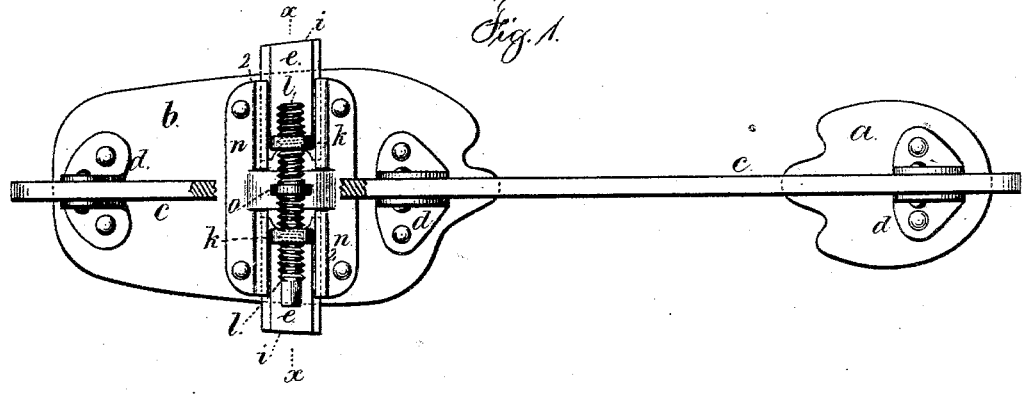
Witnesses
Chas. H. Smith
Geo. T. Pinckney
Inventor
Ephraim F. Weston
per Lemuel W. Serrell
Atty.

UNITED STATES PATENT OFFICE.

EPHRAIM F. WESTON, OF WOLCOTTVILLE, CONNECTICUT, ASSIGNOR TO UNION HARDWARE COMPANY, OF SAME PLACE.

IMPROVEMENT IN SKATES.

Specification forming part of Letters Patent No. 210,730, dated December 10, 1878; application filed August 28, 1878.

*To all whom it may concern:*

Be it known that I, EPHRAIM F. WESTON, of Wolcottville, in the county of Litchfield and State of Connecticut, have invented an Improvement in Skates, of which the following is a specification:

Skates have been made with clamps for grasping the edges of the sole, and these clamps have been placed within slides upon the under surface of the sole-plate, and have been moved in and out by a screw, having right and left hand threads toward its ends, passing through nuts upon the stocks or body portions of the clamps. The screw has also had a central flange to prevent end motion.

My invention relates to the plate that is attached to the under side of the sole-plate, and forms the slide for the clamps, and also retains the screw endwise, and at the same time it strengthens the sole-plate transversely. This plate being made in one piece is easily applied and secured, and retains all parts of the clamping apparatus in their proper relative positions, whereas in the skates heretofore made there are numerous separate flanges and holding devices that require considerable time and skill to properly apply them, and they do not hold the parts firmly in their proper relative positions.

In the drawing, Figure 1 is an inverted plan of the skate, with part of the runner removed. Fig. 2 is a cross-section through the sole-clamps at the line $x\, x$, Fig. 1; and Fig. 3 is a detached view of the plate forming the slides for the clamps.

The heel-plate $a$, sole-plate $b$, runner $c$, and brackets $d$ are all of the ordinary character. The sole-clamps $e$ are provided with the vertical clamping-hooks $i$ for clamping the edges of the sole, and with nuts or projections $k$ for the screw $l$, by means of which the clamps are expanded or contracted.

The parts thus far described have before been made, and hence are not claimed alone.

In order to attach the clamps to the under side of the sole-plate, I make use of the plate $n$, that is similar in shape to the letter H. The portions 2 2 are raised at their inner edges to form slides, within or between which the body portion of the sole-clamps $e$ move freely back and forth by the action of the screw $l$.

The center-piece of this plate is made with a mortise or depression to receive the edge of the central flange $o$ upon the screw $l$, and prevent any end motion to the screw, or to the clamps that are held by this screw. This plate $n$, extending across the sole-plate, and being all formed in one piece, strengthens the sole-plate. It insures freedom in the movement of the sole-clamps, and the parts being all directly held in their proper relative positions are not liable to become bent or distorted by the strain to which they are subjected when in use. This plate $n$ is preferably made of sheet metal, cut out and stamped up by dies; but it may be of malleable cast-iron of the same shape, and receiving the parts in the manner before described.

I claim as my invention—

1. In combination with the transverse clamps of a skate and the actuating-screw thereof, the H-shaped plate $n$, forming the slides for both the clamps, and also holding the screw in position endwise, substantially as set forth.

2. In combination with the sole-plate, transverse sliding clamps, and the screw for operating the same, the plate $n$, extending across the sole-plate and receiving the sliding clamps, substantially as set forth.

Signed by me this 23d day of August, A. D. 1878.

EPHRAIM F. WESTON.

Witnesses:
LEWIS M. JONES,
J. F. CALHOUN.